(12) United States Patent
Tichy et al.

(10) Patent No.: US 10,707,502 B2
(45) Date of Patent: Jul. 7, 2020

(54) METHOD AND APPARATUS FOR INERTIZING AN OXYGEN-CONTAINING GAS

(71) Applicant: DIEHL AEROSPACE GMBH, Ueberlingen (DE)

(72) Inventors: Franz Tichy, Eppertshausen (DE); Bernd Speth, Ueberlingen (DE); Eduard Harwardt, Stadtallendorf (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 280 days.

(21) Appl. No.: 15/631,584

(22) Filed: Jun. 23, 2017

(65) Prior Publication Data

US 2017/0373330 A1    Dec. 28, 2017

(30) Foreign Application Priority Data

Jun. 24, 2016    (DE) .................. 10 2016 007 751

(51) Int. Cl.
| | | |
|---|---|---|
| *H01M 8/04089* | (2016.01) | |
| *A62C 3/16* | (2006.01) | |
| *A62C 3/07* | (2006.01) | |
| *A62C 99/00* | (2010.01) | |
| *H01M 8/0662* | (2016.01) | |

(52) U.S. Cl.
CPC .......... *H01M 8/04089* (2013.01); *A62C 3/07* (2013.01); *A62C 3/16* (2013.01); *A62C 99/0018* (2013.01); *H01M 8/0662* (2013.01)

(58) Field of Classification Search
CPC .................................................. H01M 8/0662
See application file for complete search history.

(56) References Cited

U.S. PATENT DOCUMENTS

| | | | | |
|---|---|---|---|---|
| 6,372,983 | B1* | 4/2002 | Knaggs | H01M 2/10 174/17 LF |
| 6,815,101 | B2* | 11/2004 | de Vaal | H01M 8/04223 429/445 |
| 7,037,609 | B2* | 5/2006 | Sugawara | H01M 8/04097 429/415 |
| 2004/0091754 | A1* | 5/2004 | Bette | H01M 8/04 429/410 |
| 2013/0200216 | A1 | 8/2013 | Mock et al. | |
| 2015/0298811 | A1 | 10/2015 | Knepple et al. | |

FOREIGN PATENT DOCUMENTS

| | | |
|---|---|---|
| DE | 10343342 A1 | 2/2005 |
| DE | 102004026226 A1 | 12/2005 |
| DE | 102005053692 B3 | 1/2007 |
| DE | 102012002311 A1 | 8/2013 |
| DE | 102012023531 A1 | 6/2014 |

* cited by examiner

*Primary Examiner* — Ula C Ruddock
*Assistant Examiner* — Thomas H. Parsons
(74) *Attorney, Agent, or Firm* — Scully Scott Murphy and Presser

(57) ABSTRACT

The invention relates to a method for inertizing an oxygen-containing first gas present in a protective housing (4) surrounding a fuel cell (1), wherein a prescribed amount of a hydrogen-containing second gas is introduced into the protective housing (4) and at least part of the oxygen present in the first gas is reduced by cold combustion.

16 Claims, 1 Drawing Sheet

METHOD AND APPARATUS FOR INERTIZING AN OXYGEN-CONTAINING GAS

BACKGROUND OF THE INVENTION

The invention relates to a method and an apparatus for inertizing an oxygen-containing first gas present in a protective housing surrounding a fuel cell.

DISCUSSION OF THE PRIOR ART

A fuel cell is an apparatus for generating electric energy which is operated using a hydrogen-containing gas. Uncontrolled escape of the hydrogen-containing gas into the environment leads to a risk of fire or explosion. In order to counter this, DE 10 2004 026 226 A1 discloses operation of the fuel cell in a protective housing filled with inert gas.

DE 10 2012 023 531 A1 relates to a method of utilizing exhaust gas from a fuel cell, in particular the cathode and anode exhaust gas, as inert gas in a protective housing surrounding the fuel cell. Cathode exhaust gas is air depleted in oxygen. The reduced oxygen content is flame-retarding. The anode exhaust gas does not contain any oxygen. Anode exhaust gas is gas enriched in carbon dioxide and/or nitrogen.

DE 10 2005 053 692 B3 discloses a fire protection system for reducing risk of fire in an aircraft, which has a fuel cell for producing cathode exhaust air enriched in nitrogen. Hydrogen or reformed hydrocarbon is utilized as fuel. The composition of the cathode exhaust air is controlled in such a way that the oxygen content in the surrounding space is about 15% by volume or below 12% by volume. This significantly minimizes the risk of fire or risk of ignition compared to normal air.

A disadvantage of the prior art is that air always remains in the protected housing when filling the protective housing with inert gas.

SUMMARY OF THE INVENTION

It is an object of the invention to remedy the disadvantages of the prior art. In particular, an apparatus and a method by means of which a residual oxygen content in the protective housing can be reduced further should be provided.

The present invention is directed to a method for inertizing an oxygen-containing first gas present in a protective housing surrounding a fuel cell, wherein a prescribed amount of a hydrogen-containing second gas is introduced into the protective housing and at least part of the oxygen present in the first gas is reduced by cold combustion.

For the purposes of the present invention, "inertizing" is the production of a relatively unreactive gas using the gas present in the protective housing, in particular the binding of the residual oxygen.

For the purposes of the invention, a "protective housing" is a gastight housing which surrounds the fuel cell and optionally further chemical reactors located upstream or downstream of the fuel cell and optionally further components, for example pipes, valves and the like.

The "prescribed amount" of a hydrogen-containing second gas is advantageously such that the hydrogen from the second gas can react stoichiometrically with the oxygen from the first gas. However, the oxygen content of the first gas should at least be reduced to such an extent that the first gas becomes relatively unreactive.

"Cold combustion" is a slow oxidation which occurs without formation of a flame or without explosion.

The second gas is advantageously taken off from a reactor which is connected to the fuel cell and is located upstream of the fuel cell. The reactor can be, for example, a reformer installed upstream of the fuel cell.

In another embodiment of the method, a flushing gas of the fuel cell is used as second gas. The flushing gas or purge gas contains hydrogen. To carry out flushing, gas is discharged from the anode by briefly opening a valve, e.g. a purge valve, in order to remove undesirable constituents from the reactors, in particular the fuel cell.

In another embodiment of the method, the anode exhaust gas of the fuel cell is used as second gas. The operation of the fuel cell occurs, in contrast to the abovementioned purge operation, in such a way that hydrogen-containing gas is continuously passed through the anode. Here, a residue of unconsumed hydrogen which is present in the anode exhaust gas remains. The anode exhaust gas can be used as second gas.

In a further embodiment of the method, hydrogen which is fed to the fuel cell is used as second gas. In this case, it is not necessary for a reactor and/or reformer to be provided upstream of the fuel cell.

A catalyst, in particular a platinum sponge, is advantageously used for carrying out the cold combustion. The catalyst lowers the activation energy of the reaction between hydrogen and oxygen. The formation of a flame or even an explosion can be avoided safely and reliably in this way.

It is advantageous to measure the oxygen content of the first gas or the oxygen content of a gas mixture of the first and the second gas present in the protective housing and determine the prescribed amount of the second gas to be introduced therefrom. Measuring the oxygen content enables the prescribed amount of the second gas to be set more accurately.

In a further embodiment of the method, the hydrogen content of a gas mixture of the first and the second gas present in the protective housing is measured and introduction of the second gas is stopped when hydrogen is detected. When the method is employed in vehicles having high safety requirements, in particular aircraft, the hydrogen content and oxygen content of the gas mixture present in the protective housing are advantageously monitored continually. When the protective housing develops a leak and oxygen consequently gets into the protective housing, the inert conditions can be maintained by continuous monitoring in combination with one of the above-described methods.

In a further embodiment of the method, the amount and composition of the second gas are set so that a pressure in the protective housing is kept in a prescribed range. The reaction of hydrogen and oxygen to form water, which can at least partly condense, reduces the volume of the gas mixture present in the protective housing. The pressure can be kept in a prescribed range when, for example, two thirds of the volume of the second gas is hydrogen and one third is a gas other than hydrogen. The other gas replaces the volume of the oxygen in the first gas in the protective housing. If the water present condenses, a subatmospheric pressure arises in the second gas in the case of a relatively high hydrogen content, while a subatmospheric pressure arises in the case of a lower hydrogen content.

It is advantageous to obtain the second gas by mixing a hydrogen-containing gas having a hydrogen content of more than 66.67% by volume of $H_2$ with a further hydrogen-containing gas having a hydrogen content of less than 66.67% by volume of $H_2$ in such a way that the second gas contains a proportion of hydrogen of from 60 to 70% by volume of $H_2$. However, depending on the ambient temperature, which is typically below 100° C., not all of the $H_2O$ is condensed to form water but instead part thereof can remain as water vapour. The inert gas in the protective housing is then a humid inert gas.

Furthermore, an apparatus for inertizing an oxygen-containing first gas present in a protective housing surrounding a fuel cell, wherein a controllable gas feed device for a hydrogen-containing second gas into the protective housing is provided, so that at least part of the oxygen present in the first gas can be reduced by cold combustion, is proposed. The gas feed device is particularly suitable for controlling or regulating a mass flow of the second gas. Furthermore, return flow of the oxygen-containing first gas is advantageously prevented thereby.

A reactor which is connected to the fuel cell and is located upstream of the fuel cell advantageously has a first gas offtake device for the second gas which is connected to the gas feed device. The second gas can be a reaction product formed in the reactor from a fuel gas. It is advantageous that in this case no additional gas is required for the inertization.

In a further embodiment, a second gas offtake device for a flushing gas is provided at the output of the fuel cell and is connected to the gas feed device for the second gas into the protective housing. The second gas offtake device is configured so that no gas gets from the protective housing into the offtake device.

In a particularly advantageous embodiment, a catalyst, in particular a platinum sponge, for carrying out the cold combustion is provided at the outlet of the gas feed device.

A further embodiment of the invention provides for the apparatus to comprise a first sensor for measuring the oxygen content of the first gas or the oxygen content of a gas mixture of the first and second gas present in the protective housing, which transmits a first signal to a control unit for controlling the prescribed amount of the second gas to be introduced. The control unit controls the gas feed device.

The apparatus advantageously also comprises a second sensor for measuring the hydrogen content of a gas mixture of the first and second gas present in the protective housing, which transmits a second signal to a control unit for controlling stopping of the introduction of the second gas. The composition, in particular oxygen and/or hydrogen content, of the gas in the protective housing can be monitored and/or adjusted by means of the sensor(s).

In a further advantageous embodiment, the apparatus comprises a pressure sensor in the protective housing, which transmits a third signal to the control unit which can control the amount and composition of the second gas in such a way that the pressure in the protective housing is kept in a prescribed range. In order to control the composition, a gas mixing unit, for example, by means of which a composition of the second gas can be adjusted, can be controlled by means of the control unit.

The apparatus advantageously comprises a gas mixing unit for producing the second gas, wherein a hydrogen-containing gas having a hydrogen content of more than 66.67% by volume of $H_2$ is mixed with a further hydrogen-containing gas having a hydrogen content of less than 66.67% by volume of $H_2$ in such a way that the second gas contains a proportion of hydrogen of from 60 to 70% by volume of $H_2$. The pressure in the protective housing can be kept in the prescribed range by means of the gas mixing unit.

The above-described method for inertization can also be carried out using other gases instead of hydrogen. The protective housing does not necessarily have to be the protective housing of a fuel cell. For example, a protective housing in which a petrol or diesel engine is accommodated can be made inert by means of a liquid fuel, in particular petrol or diesel. In this case, the oxygen present in the protective housing can be reduced by means of controlled leakage of petrol or diesel and a suitable catalyst and thus be bound.

In a similar way, a protective housing in which a machine powered by gas, for example natural gas, is accommodated can also be made inert.

The method of the invention is not restricted to the one-off creation of an inert atmosphere in a protective housing. The method can also be configured in such a way that the inert atmosphere is maintained even when, for example, the oxygen content in the protective housing increases due to a leakage or continuous gas replacement. For this purpose, the oxygen content in the housing can be kept at a prescribed level by means of suitable regulation and an oxygen sensor provided in the protective housing.

BRIEF DESCRIPTION OF THE DRAWINGS

Exemplary embodiments of the present invention are illustrated in more detail below with reference to the accompanying drawings in which.

DETAILED DESCRIPTION OF THE INVENTION

Figure 1:
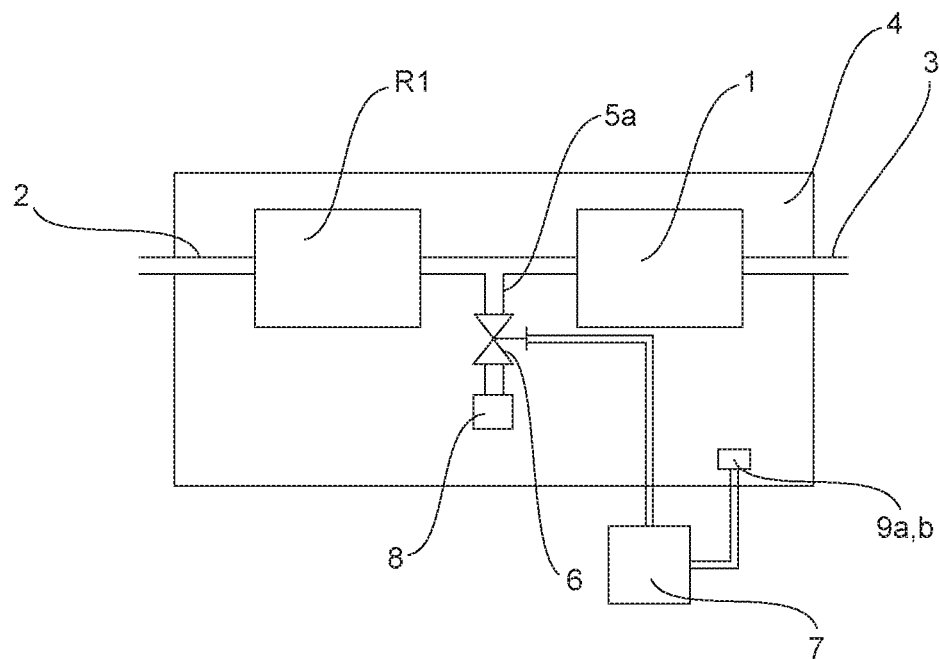
FIG. 1 shows an apparatus in accordance with the present invention having a first gas offtake device.

FIG. 1 schematically shows a fuel cell 1 having a gas inlet 2 and a gas outlet 3. The fuel cell 1 is surrounded by a protective housing 4. The fuel cell 1 is connected upstream to a reactor R1. Between the reactor R1 and the fuel cell 1, there is a first offtake device 5a which is connected to a controllable gas feed device 6. A catalyst 8 is advantageously located at the outlet of the gas feed device 6.

The controllable gas feed device 6 can be controlled by means of a control device 7. A first sensor 9a and/or a second sensor 9b by means of which the hydrogen content and/or oxygen content in the protective housing 4 is measured is advantageously arranged in the protective housing 4. Corresponding signals are transmitted to the control device 7. A hydrocarbon is introduced via the gas inlet 2 into the reactor R1. In the reactor R1, which is in particular a reformer, a hydrogen-containing second gas is produced. Part of the second gas is taken off at the first offtake device 5a between the first reactor R1 and the fuel cell 1 and is conveyed via the controllable gas feed device 6 into the protective housing 4. Here, the amount in particular but also a flow rate of the second gas is controlled. The control of the gas feed device 6 ensures that cold combustion occurs. In particular, it is also ensured by means of the gas feed device 6 that no gas flows back from the protective housing 4 into the first offtake device 5a. A catalyst 8 is advantageously installed at the outlet of the gas feed device 6 so that the cold combustion proceeds over the catalyst 8. The first sensor 9a and/or the second sensor 9b determines the oxygen content and/or hydrogen content in the protective housing 4. The first sensor 9a transmits a first signal to the control 7 of the gas feed device 6 and the second sensor 9b correspondingly transmits a second signal.

Figure 2:
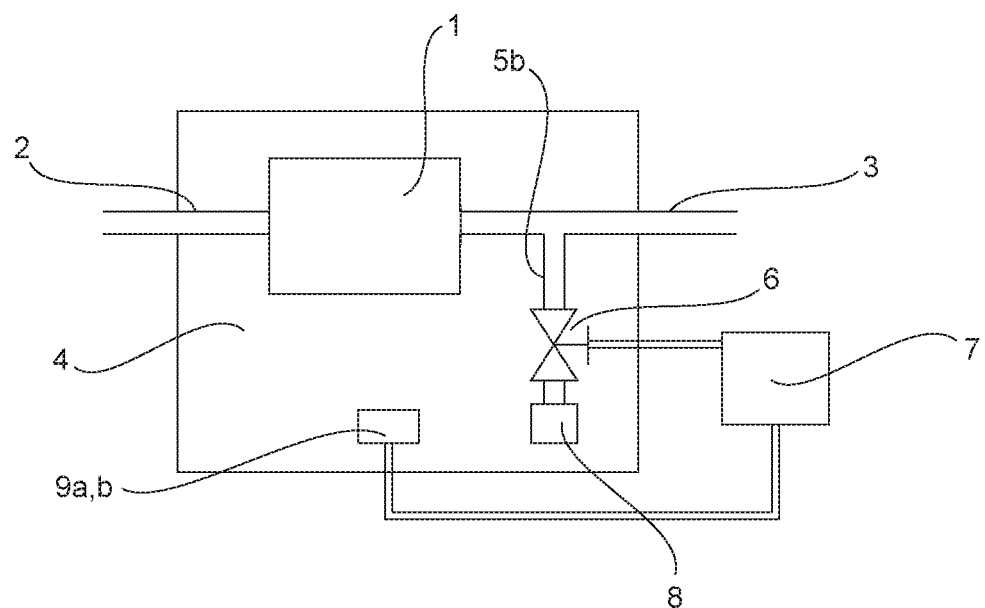
FIG. 2 shows an apparatus in accordance with the present invention having a second gas offtake device.

FIG. 2 shows an apparatus having a second gas offtake device 5b which is provided at the outlet of the fuel cell 1.

This second gas offtake device 5b is again connected to a controllable gas feed device 6 which introduces the hydrogen-containing second gas via a catalyst 8 into the protective housing 4. Hydrogen and oxygen content in the protective housing 4 can be determined by means of a first sensor 9a and a second sensor 9b. The first sensor 9a and/or the second sensor 9b transmit first and/or second signals to the control unit 7 which regulates the gas feed device 6. The flushing gas or the hydrogen-containing anode exhaust gas is taken off from the fuel cell 1 by means of the second gas offtake device 5b and conveyed via the controllable gas feed device 6 into the protective housing 4.

LIST OF REFERENCE SYMBOLS

1 Fuel cell
2 Gas inlet
3 Gas outlet
4 Protective housing
5a First offtake device
5b Second offtake device
6 Gas feed device
7 Control unit
8 Catalyst
9a First sensor
9b Second sensor
R1 Reactor

What is claimed is:

1. A method for inertizing an oxygen-containing first gas present in a protective housing surrounding a fuel cell, wherein a prescribed amount of a hydrogen-containing second gas is introduced into the protective housing and at least part of the oxygen present in the first gas is reduced by cold combustion, wherein the oxygen content of the first gas or the oxygen content of a gas mixture of the first and second gas present in the protective housing is measured and the prescribed amount of the second gas to be introduced is determined therefrom.

2. The method according to claim 1, wherein the second gas is taken from a reactor (R1) which is connected to the fuel cell and is located upstream of the fuel cell.

3. The method according to claim 1, wherein a flushing gas or an anode exhaust gas from the fuel cell is used as second gas.

4. The method according to claim 1, wherein a catalyst is used for carrying out the cold combustion.

5. The method according to claim 4, wherein said catalyst is a platinum sponge.

6. The method according to claim 1, wherein the hydrogen content of a gas mixture of the first and second gas present in the protective housing is measured and the introduction of the second gas is stopped when hydrogen is detected.

7. The method according to claim 1, wherein the amount and composition of the second gas are set so that a pressure in the protective housing is kept in a prescribed range.

8. The method according to claim 7, wherein the second gas is produced by mixing a hydrogen-containing gas having a hydrogen content of more than 66.67% by volume of $H_2$ with a further hydrogen-containing gas having a hydrogen content of less than 66.67% by volume of $H_2$ in such a way that the second gas contains a proportion of hydrogen of from 60 to 70% by volume of $H_2$.

9. An apparatus for inertizing an oxygen-containing first gas present in a protective housing surrounding a fuel cell, wherein a controllable gas feed device for a hydrogen-containing second gas into the protective housing is provided, so that at least part of the oxygen present in the first gas can be reduced by cold combustion; and, a first sensor for measuring the oxygen content of the first gas or the oxygen content of a gas mixture of the first and second gas present in the protective housing is provided, which transmits a first signal to a control unit for controlling the prescribed amount of the second gas to be introduced.

10. The apparatus according to claim 9, wherein a reactor (R1) which is connected to the fuel cell and is located upstream of the fuel cell has a first gas offtake device for the second gas which is connected to the gas feed device.

11. The apparatus according to claim 9, wherein a second gas offtake device is provided for a flushing gas or an anode exhaust gas at the outlet of the fuel cell and is connected to the gas feed device.

12. The apparatus according to claim 9, wherein a catalyst for carrying out the cold combustion is provided at the outlet of the gas feed device.

13. The apparatus according to claim 12, wherein said catalyst is a platinum sponge.

14. The apparatus according to claim 9, comprising a second sensor for measuring the hydrogen content of a gas mixture of the first and second gas present in the protective housing, which transmits a second signal to a control unit for controlling stopping of the introduction of the second gas.

15. The apparatus according to claim 9, comprising a pressure sensor in the protective housing, which transmits a third signal to a control unit which can control the amount and composition of the second gas in such a way that the pressure in the protective housing is kept in a prescribed range.

16. The apparatus according to claim 9, which comprises a gas mixing unit for producing the second gas, wherein a hydrogen-containing gas having a hydrogen content of more than 66.67% by volume of $H_2$ is mixed with a further hydrogen-containing gas having a hydrogen content of less than 66.67% by volume of $H_2$ in such a way that the second gas contains a proportion of hydrogen of from 60 to 70% by volume of $H_2$.

* * * * *